US006386641B2

(12) United States Patent
Mondy

(10) Patent No.: US 6,386,641 B2
(45) Date of Patent: May 14, 2002

(54) WELD JOINT DESIGN FOR CORNERS

(75) Inventor: Michael C. Mondy, Everett, PA (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/298,105

(22) Filed: Apr. 22, 1999

(51) Int. Cl.[7] ............................................. E21C 35/19
(52) U.S. Cl. ..................... 299/79.1; 299/39.8; 299/102; 228/214; 228/164; 403/381
(58) Field of Search ................ 228/214, 222, 228/164; 299/39.8, 79.1, 102; 403/381, 331

(56) References Cited

U.S. PATENT DOCUMENTS

| | | | | |
|---|---|---|---|---|
| 1,382,199 A | * | 6/1921 | Lachman | 52/729.1 |
| 2,885,462 A | * | 5/1959 | Sylvester | 228/214 |
| 3,832,523 A | | 8/1974 | Kitani et al. | 219/137 |
| 4,097,716 A | | 6/1978 | Reichelt, Jr. et al. | 219/137 |
| 4,159,746 A | | 7/1979 | Wrulich et al. | 175/354 |
| 4,208,563 A | | 6/1980 | Frantzreb, Sr. et al. | 219/73 |
| 4,343,516 A | * | 8/1982 | Aden | 299/106 |
| 4,488,759 A | | 12/1984 | Bergqvist | 299/81 |
| 4,542,943 A | | 9/1985 | Montgomery, Jr. | 299/93 |
| 4,944,560 A | | 7/1990 | Osterwise | 299/91 |
| 5,028,357 A | * | 7/1991 | Bardo | 261/111 |
| 5,044,869 A | * | 9/1991 | Shindo et al. | 414/785 |
| D329,192 S | * | 9/1992 | Susac | D8/349 |
| 5,159,175 A | | 10/1992 | Loeber | 219/137 |
| 5,472,134 A | | 12/1995 | Gunnell et al. | 228/44.3 |
| 5,595,040 A | * | 1/1997 | Chen | 52/729.1 |
| 5,738,415 A | | 4/1998 | Parrott | 299/104 |

FOREIGN PATENT DOCUMENTS

| EP | 0332019 | 9/1989 |
|---|---|---|
| EP | 0607068 | 7/1994 |
| JP | 04143073 | 5/1992 |

OTHER PUBLICATIONS

Kennametal Advertisement for QC110HD Block titled "Quick fix", Copyright 1998 by Kennametal Inc. (1 page).
Kennametal Advertisement entitled "For reliability . . . For productivity . . . For quality . . . Nobody beats our drums!" B89–58 (2 pages).
Kennametal Advertisement entitled "Kennametal Cutting Systems" B98–4(1)B8, Copyright 1998 by Kennametal Inc. (2 pages).
Kennametal Advertisement entitled "Block *Budget–* Busters" B95–113(2)M5 Copyright 1995 by Kennametal Inc. (1 page).
Kennametal Advertisement entitled "Kennametal castings wear parts and the mining industries" AM98–15(2.5)LB, Copyright 1997 by Kennametal Inc. (12 pages).
International Search Report for PCT International application No. PCT/US00/06867, dated Jul. 6, 2000.
Patent Abstracts of Japan vol. 016, No. 422 (M–1305) Sep. 4, 1992 & JP 04 143073 A May 18, 1992.

* cited by examiner

*Primary Examiner*—David Bagnell
*Assistant Examiner*—John Kreck
(74) *Attorney, Agent, or Firm*—Kevin P. Weldon

(57) ABSTRACT

A design is disclosed for promoting the formation of weld between a first member and a second member whereby a fin is introduced at the outer corner portion of the first member to minimize the creation of defects such as runout or rollover. While such a design is applicable to any industrial welding operation, this design is of particular interest for welding bases or bit blocks holding cutting bits onto rotatable drums, wheels or chains used in construction or mining operations.

22 Claims, 5 Drawing Sheets

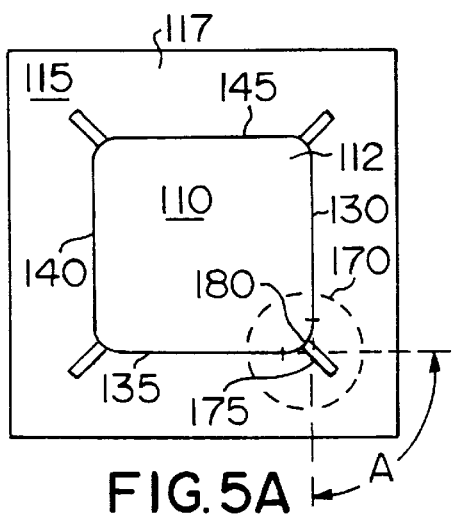
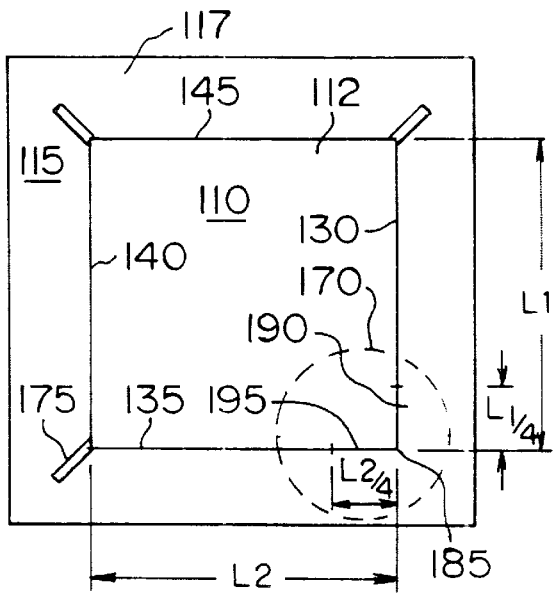
FIG. 5A
FIG. 5B
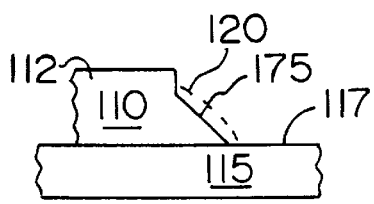
FIG. 6A
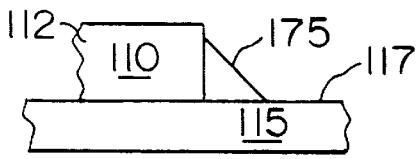
FIG. 6
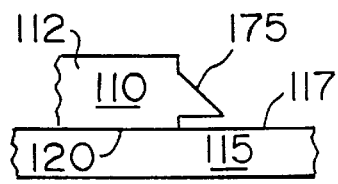
FIG. 6B
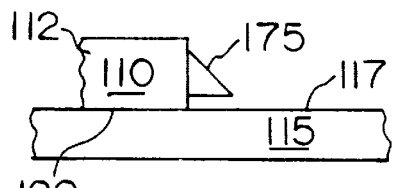
FIG. 6C
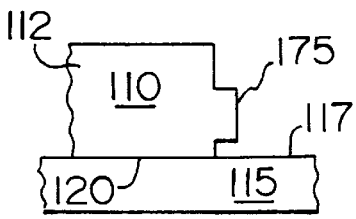
FIG. 6D
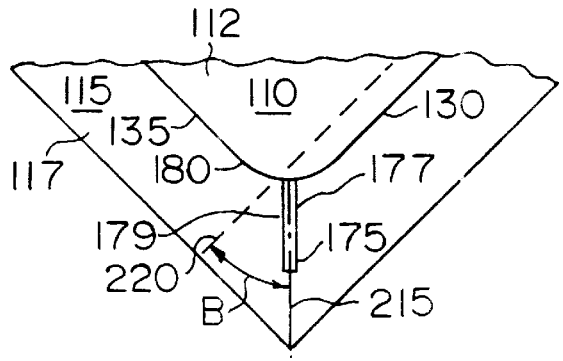
FIG. 7

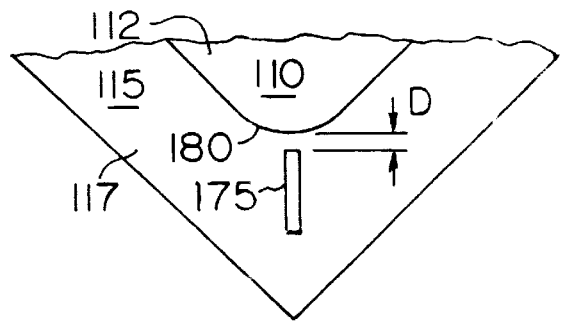
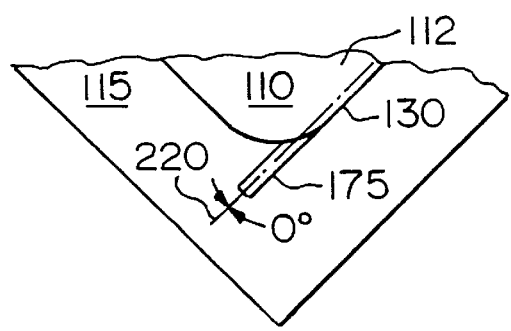
FIG. 7A    FIG. 7B
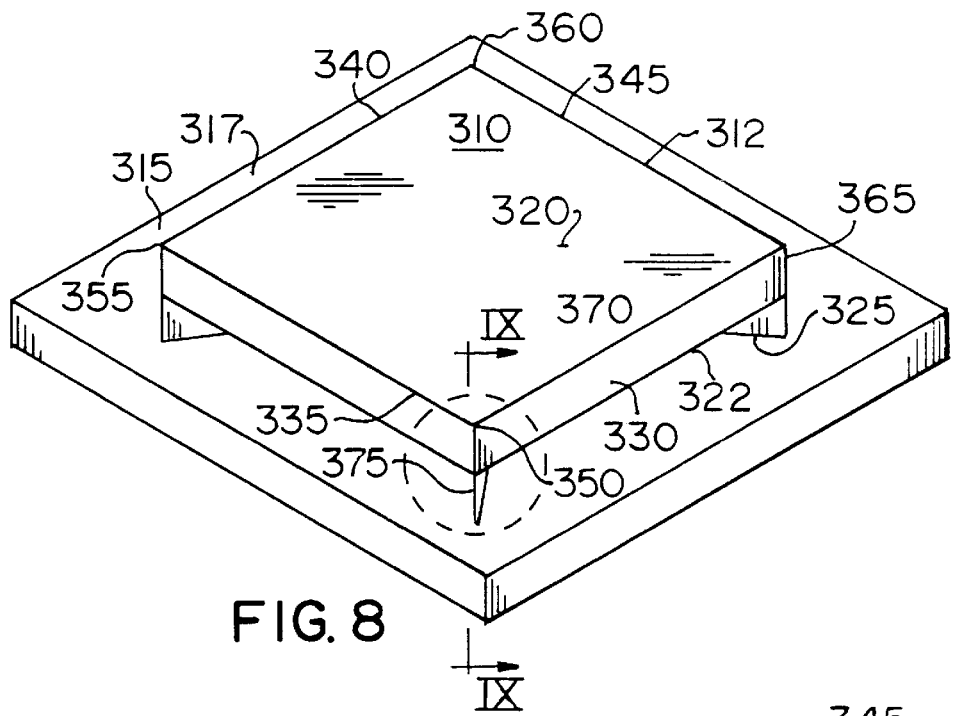
FIG. 8
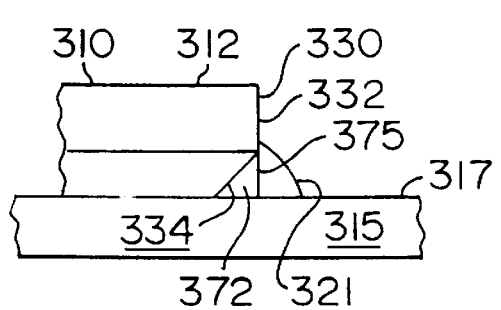
FIG. 9
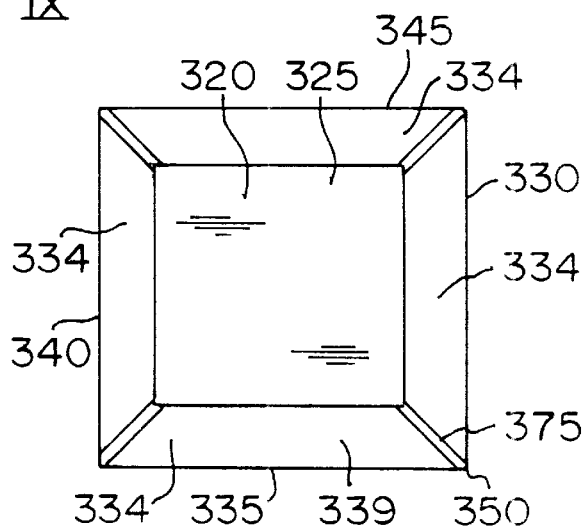
FIG. 10

WELD JOINT DESIGN FOR CORNERS

BACKGROUND OF THE INVENTION

1. Field of the Invention

The invention relates to a design to promote welding in corner regions and more particular to the use of a fin extending outwardly from an outside corner region to promote the proper formation of a weld around such a corner region.

2. Description of the Related Art

Welding is defined as the process of uniting two members by heating them until they are molten and fused, with or without the use of a filler material.

The focus of this application will be directed to welding utilizing a filler material to join two parts which intersect at a corner and for which weld filler must be used to produce a continuous weld around the corner.

Manual welding typically is labor intense and requires a high level of skill on behalf of the welder to efficiently produce a strong high quality weld. Because there are frequently great demands for production placed upon a welder, there is always a desire to improve efficiency by either improving the manner in which the weld is laid or by providing a design which requires less weld material. A design which may permit both of these beneficial features is highly desirable.

Welding material around the corner of a workpiece presents unique problems to which the subject invention is directed. As an example, FIG. 1, which is prior art, illustrates a system by which a first member 10 is secured to a second member 15 by a weld 20. The first member 10 has at least a first side 25 and a second side 30. Each side has an upper portion 32 and a lower portion 34 wherein the lower portion 34 is chamfered relative to the upper portion 32. The weld 20 is fused to the lower portion 34 of at least the first side 25 and the second side 30 of the first member 10. The weld 20 is additionally fused to the surface 35 of the second member 15 thereby securing the first member 10 to the second member 15.

Although defects associated with welding may occur along any portion of the weld 20, the outside corner portions of welds seem to more frequently have defects. The first member 10 which is illustrated as a solid piece, has only outside corners 36, 37, 38, 39. To put this in perspective, if the first member 10 was hollowed out to form a cavity having a perimeter of the same shape as the exterior of the first member 10, the enclosed corners would be referred to as inside corners.

FIG. 2 illustrates a section view of the corner portion of the weld along arrows "2—2" in FIG. 1. The lower portion 34 of the side 25 is not illustrated in either this view or the view to be discussed with FIG. 3. In FIG. 2, the bottom face 40 of the first member 10 contacts the surface 35 of the second member 15. Weld 20 is used to attach the first member 10 to the second member 15. The metal filler of the weld 20 penetrates the side 25 of the first member 10 and simultaneously penetrates the surface 35 of the second member 15. However, it is not uncommon when welding a corner region to produce a defect known as a rollover, which is also called an overlap. Such a defect is associated with fillet welds and can be produced when either the current of an arc welding machine is too low to properly fuse the second member 15 or the travel speed for the welding process is too low to accept the amount of metal filler being deposited. As a result, a portion of the weld 20 merely flows onto an area of surface 35 and does not fuse with the surface 35. The rollover portion, which is indicated by 50 must be removed to ensure the integrity of the weld 20. Such a defect must be removed by grinding, which requires additional time and labor.

Another type of weld defect which is not uncommon in corner regions is illustrated in FIG. 3 and is referred to as an undercut. FIG. 3 is a view similar to FIG. 2 illustrating a different defect. An undercut is an irregular gouge which is generally found in the upper toe of a horizontal fillet weld. With reference to FIG. 3, the first member 10 has a bottom face 40 which contacts the surface 35 of the second member 15. However, in this situation, the weld 20 droops from a recess or undercut 55 produced in the side 25 of the first member 10. The side 25 of the first member 10 has been melted but has not been refilled with weld material. Most often this defect is caused by improper selected welding conditions such as the electrode angle, travel speed and welding current. It is more likely to occur when attempting to make fillet welds with legs that are more than 0.3 inches in length. Just as a with a rollover defect however, such defects are unacceptable if the integrity of the weld is to be maintained and such defects must be removed. These defects in welds on outside corners may be avoided but only at the cost of a significant increase in welding time and expense.

U.S. Pat. No. 3,832,523 discloses a method for electrical arc welding. In FIG. 12 of that patent, a segment 50 is illustrated which is used on a vertical section for preventing a resulting weld bead which is not completely solidified from drooping. Segment 50 acts as a physical barrier to the weld material. As a result, the section on the plates under segment 50 will not be covered with weld material and therefore the weld will not be continuous. Furthermore, the weld does not extend around a corner and many applications require a continuous bead of weld material around a corner.

U.S. Pat. No. 4,208,563 illustrates a welding method using a break away flux dam in which copper wires are used to surround the weld area and create a pool of molten weld metal with a top layer of flux. While this illustrates a manner of containing a weld, it once again does not address a weld around a corner with a continuous bead of weld material.

A design is needed which permits a welder to secure a first member, which may be metal, having outside corners to a second member, which also may be metal, while applying a continuous weld around the corners of the member in an expedient fashion that will provide a weld with integrity and minimize the potential for producing defects such as rollover and undercut while also reducing the time and cost of welding.

While such a design is applicable to welding any two members with outside corners, it is of particular significance in securing a bit block or base to a rotatable member, such as a drum, wheel or chain, for equipment used in construction operations, such as road planning or trenching, or in mining operations, such as coal mining.

BRIEF SUMMARY OF THE INVENTION

One embodiment of the invention is directed to a first member for welding to a second member wherein the first member is comprised of a body having a top, a bottom and a face on the bottom for contacting a surface on the second member. The first member has a plurality of sides between the top and the bottom including a first side adjacent to the face, and a second side adjacent to the face. The first side and the second side converge to define an outside corner region between the top and the bottom. A fin extends from the corner region to promote the formation of a weld in the corner region.

A second embodiment of the invention is directed to a system which includes the first member just described mounted upon a second member using weld material.

A third embodiment of the invention is directed toward one application of the first member as a metal block for mounting upon a metal drum used in mining or construction operations.

A fourth embodiment of the invention is directed toward one application of a system including the first member as a metal block mounted to a metal drum and secured with weld material for use in mining or construction operations.

BRIEF DESCRIPTION OF THE DRAWINGS

FIG. 5A illustrates a top view of the arrangement in FIG. 4 in which the first member has radiussed corners;

FIG. 5B illustrates a variation of the view in FIG. 5A in which the first member has square corners;

FIG. 6 is a cross-sectional view of a corner illustrated by arrows "6—6" in FIG. 4 in accordance with the subject invention;

FIGS. 6A, 6B, 6C and 6D are cross-sectional views similar to FIG. 6 but showing different embodiments of the subject invention;

FIG. 7 is a portion of the plan view illustrated along arrows "7—7" illustrated in FIG. 4;

FIGS. 7A and 7B are plan views showing different embodiments of the design illustrated in FIG. 7;

FIG. 8 is a perspective view illustrating a first member attached to a second member having fins extending from within the first member;

FIG. 9 is a sectional view of the corner region along arrows "9—9" in FIG. 8;

FIG. 10 is a bottom view of the first member illustrated in FIG. 8;

DETAILED DESCRIPTION OF THE INVENTION

The subject invention is directed to outwardly extending fins in the outer corner region of a first member secured to a second member by welding. By providing a fin in the body of the weld, the weld material will have additional surface on which to adhere. This additional surface provides support to the weld when in a fluid condition thereby minimizing defects such as rollover or undercut in or near the corner regions.

Welding which is appropriate to secure the first member to the second member, may be any number of different weld methods including arc welding, gas welding or any other welding method which deposits a filler between two pieces to be joined.

Additionally, while the subject invention will be illustrated using a single fillet weld on a tee joint, it should be appreciated the subject invention may be useful for many other types of welds including a single level groove, a single J-groove or any other weld type suitable for a tee joint in which an outside corner must be welded.

Figure 1:
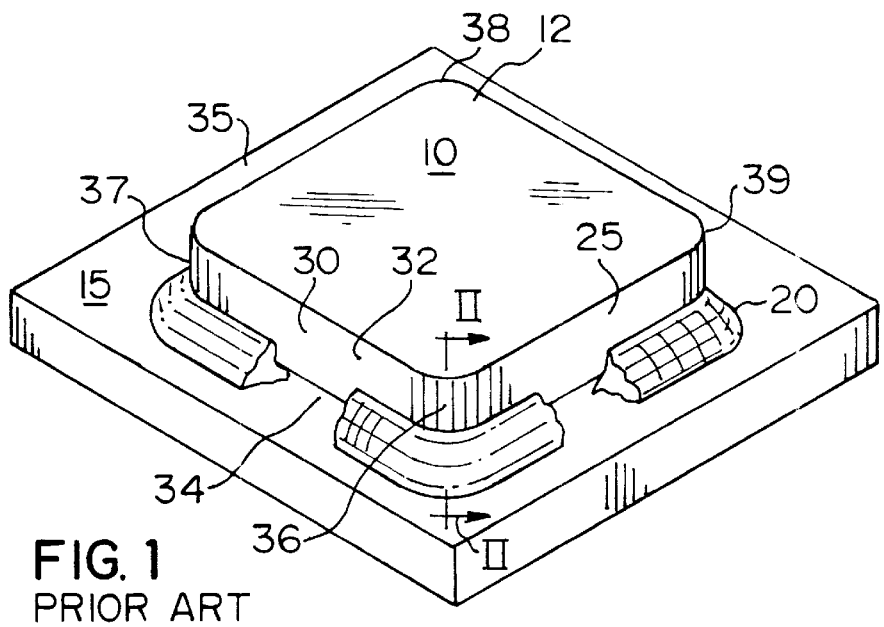
FIG. 1 is prior art and illustrates a perspective view of a first member secured to a second member with a weld.
Figure 2:
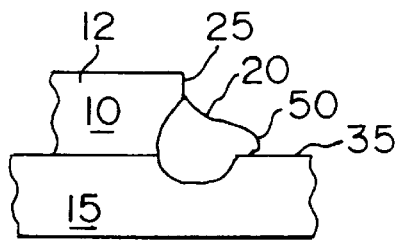
FIG. 2 is prior art and illustrates a cross-sectional view along arrows "2—2" in FIG. 1 highlighting a weld defect.
Figure 3:
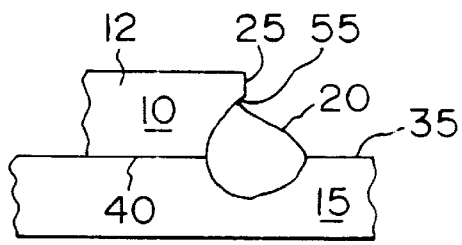
FIG. 3 is prior art and illustrates a view similar to FIG. 2 highlighting a different weld defect.
Figure 4:
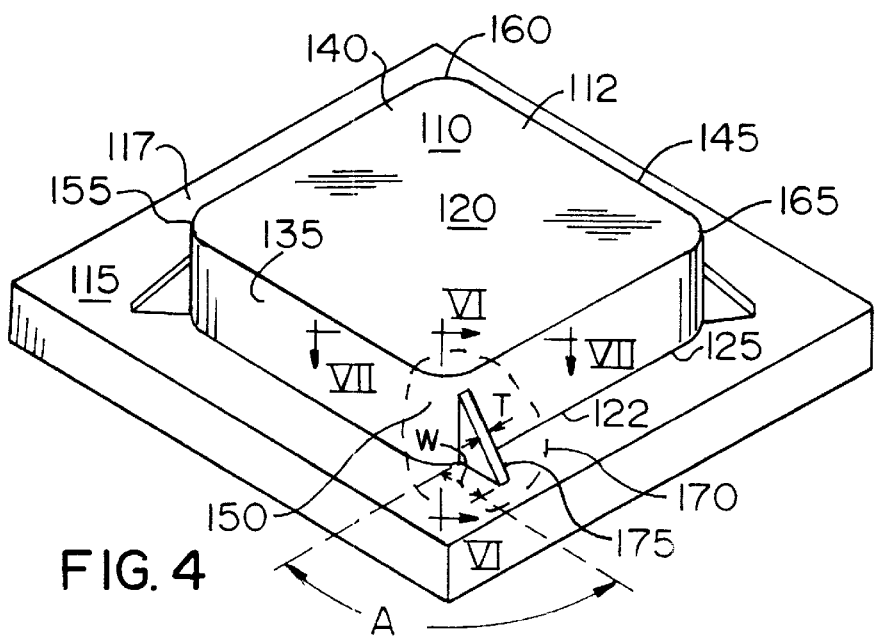
FIG. 4 is a perspective view of a first member to be secured to a second member by welding and incorporating a design in accordance with the subject invention.

FIG. 4 illustrates a perspective view of a first member 110 attached to a second member 115 on the surface 117 of the second member 115. The first member 110 has a body 112 and a top 120 and a bottom 122 with a bottom face 125 and a plurality of sides 130, 135, 140 and 145 and outside corners 150, 155, 160, 165 between the top 120 and bottom 122. While the first member 110 illustrated in FIG. 4 has four sides 130, 135, 140 and 145 and four outside corners 150, 155, 160, 165 the subject invention will be directed to only an outside single corner 150 with the understanding that the invention may be applicable to any outside corners including the remaining three illustrated in FIG. 4. For that reason, side 130 will be referred to as the first side 130 and side 135 will be referred to as the second side 135.

While the body 112 in FIG. 4 is quadrilateral, attention will be directed to one outside corner and it should be appreciated the subject invention may be applied to a first member 110 having any number of different shapes in so much as any of these shapes has at least one outside corner in which a continuous weld is required.

The first side 130 and the second side 135 are adjacent to the bottom face 125. Furthermore, the first side 130 and the second side 135 converge to define an outside corner region highlighted by the dotted line labeled 170 between the top 120 and bottom 122.

A fin means 175 extends from the outside corner region 170 to promote the formation of a weld (not shown) in the outside corner region 170. The first side 130 and the second side 135 converge to form a corner angle A which, although shown as approximately 90 degrees in FIG. 4, may actually have a range between 10 degrees to 150 degrees. The first member 110, second member 115 and fin means 175 are all made of materials which are compatible for welding together. As an example, all of the parts may be weld compatible metal. The weld material must also be selected to be compatible with these parts.

Turning attention to FIG. 5A, the outside corner region 170 is defined with a transition segment 180 connecting the first side 130 with the second side 135. FIG. 5B illustrates a different arrangement in which there is no transition segment but has a corner region 170 bordered by first side segment 190 and second side segment 195. Fin 175 is removed from one corner for illustration clarity. The first side 130 has a length L1. The second side 135 has a length of L2. The first side 130 and second side 135 intersect at intersection point 185. The first side segment 190 extends from the intersection point 185 back along the first side 130 a distance of L1/4 or less. The second side segment 195 extends from the intersection point 185 back along the second side 135 a distance of L2/4 or less.

Therefore, the corner region 170 may be comprised of the intersection of the first side 130 and second side 135 through a transition segment 180 as illustrated in FIG. 5A or may be comprised of the region proximate to the intersection of the first side 130 and the second side 135. It should be noted that on FIG. 5A the transition segment 180 is illustrated as a curved segment but that this segment may also be straight.

FIG. 6 illustrates the fin 175 as a separate piece attached to the body 112. Such an attachment may be through a tack weld or other conventional means for attaching.

FIG. 6A illustrates another embodiment in which the fin 175 is not a separate piece but is an integral part of the body 112 of the first member 110 which can be formed when the body 112 itself is formed by casting or forging or may be subsequently machined or ground into a casted or formed part. A weld 20 is illustrated in phantom lines to demonstrate the relative position of the weld 20 with respect to the fin 175.

In still another embodiment, the fin 175 may be an integral part of the body 112 or may be a separate piece attached to the body 112 but, in either case as illustrated in FIGS. 6B and 6C, the fin 175 may be vertically spaced from the bottom 120 of the body 112.

Although the fin mean 175 has been illustrated as having a triangular configuration, the fin means 175 may also have any of a wide variety of polygonal shapes including a quadrilateral shape as illustrated in FIG. 6D.

Briefly returning to FIG. 4, the fin means 175 may have a thickness "t" and a width "W" wherein the thickness t is less than ¼ of the width W of the fin means 175 when the width W is the maximum width at any part of the fin means 175.

Directing attention to FIG. 7, the fin means may have two opposing vertical walls 177, 179 and a fin means line 215 extending between them to form a fin means angle B with a line 220 extending along one side 130 of the body 112. As illustrated in FIG. 7, the fin means angle B is approximately 45° however may have a value of between 0–45°.

As illustrated in FIG. 7A, which is an alternate embodiment of the arrangement in FIG. 7, it is possible to mount the fin means 175 upon the surface 117 of the second member 115 adjacent to the body 112 of the first member 110. The fin means 175 may also be spaced a fin means distance D from the body 112. When the fin means 175 is spaced from the body 112 of the first member 110, the length of the fin means 175 and fin means distance D must be considered together such that the intended weld will completely enclose the area of the fin means 175.

As previously discussed in conjunction with FIG. 7, the fin means 175 may be oriented along the line 215 through the fin means 175 to form the fin means angle between 0–45° with a line extending along the first side 130. FIG. 7B illustrates such an arrangement in which the fin means angle B is 0°.

So far each embodiment of the subject invention has illustrated the fin means 175 extending outwardly from the outermost perimeter of the body 112. However, it is possible for the underside of the member to have a chamfer and the fin means 175 to be recessed within the chamfer such that it extends outwardly from within the body 112.

FIG. 8 illustrates a perspective view of a first member 310 having a body 312 mounted to a second member 315 by weld material (not shown). The second member 315 has a surface 317. The body 312 has a top 320 and a bottom 322 including a bottom face 325 which rests against the surface 317 of the second member 315. The base has sides 330, 335, 340, 345 with associated corners 350, 355, 360, 365.

Just as before, the body 312 may have any number of a variety of different shapes and for purposes of describing the subject invention, side 330 will be referred to as the first side 330 and side 335 as the second side 335 which meet to define an outside corner region 370 similar to that described in previous embodiments.

The embodiment illustrated in FIG. 8 is different from previous embodiments in that, as illustrated in FIG. 9, which is a section view along arrows "9—9" in FIG. 8, the side 330 is comprised of an upper portion 332 and a lower portion 334 which is chamfered inwardly from an upper portion 342. The chamfer on the lower portion 334 creates a cavity 372 beneath the perimeter of the body 312 which permits a greater amount of weld material to be used in securing the first member 310 to the surface 317 and the second member 315. A fin 375 may be positioned proximate to the chamfer on the lower portion 334 in the corner region 370 to promote the formation of a weld 321.

FIG. 10 illustrates a bottom view of the first member 310 in FIG. 8 and shows the bottom 322 with the bottom face 325 and the lower portion 334 extending from the sides 330, 335, 340 and 345 to define the chamfer on the lower portion 334.

What has so far been described is a first member secured to a second member utilizing outwardly extending fins to promote the formation of a weld. It should be understood that such a design can be applied to a wide number of designs in which one piece is welded to another piece and in which it is necessary to have weld material around an outside corner associated with these pieces.

Figure 11:
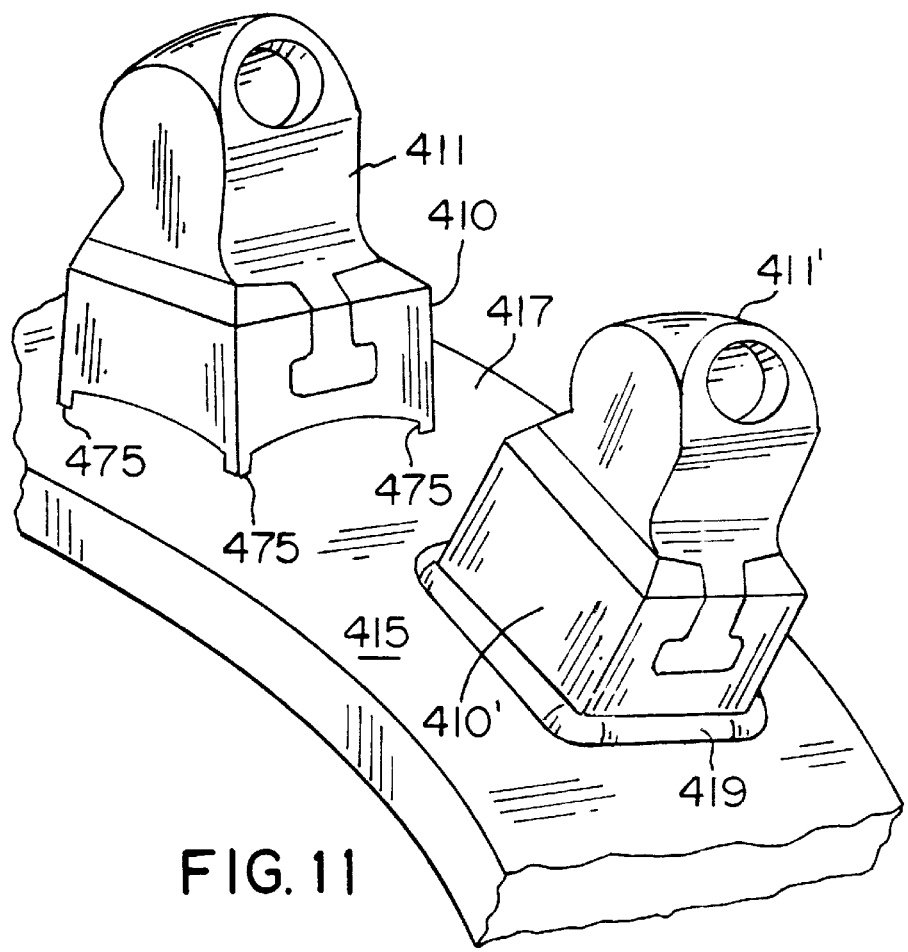
FIG. 11 illustrates a perspective view of a first member which is a base incorporating the subject invention and secured to the surface of a second member, which is a rotatable member, used for mining or construction operations.
Figure 12:
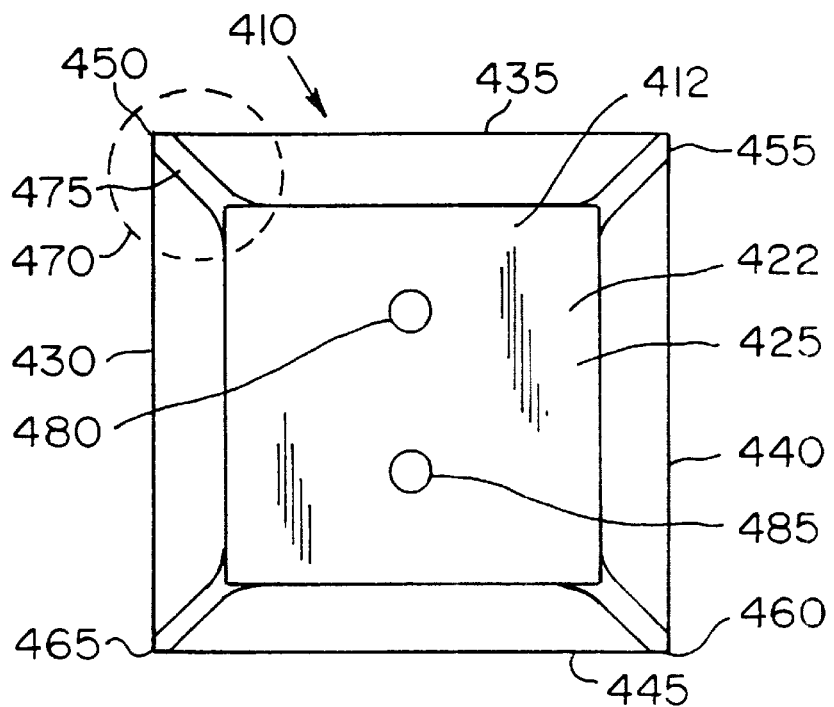
FIG. 12 is a bottom view of the base illustrated in FIG. 11.

While many practical applications for this invention may be found, one particular application is illustrated in FIGS. 11–12 in which a base 410 holding a bit block 411 with a cutting bit (not shown), wherein the base 410 is secured to the surface 417 of a rotatable member 415, such as a rotatable drum, used in mining or construction operations. A similar arrangement without fins is disclosed in U.S. Pat. No. 4,542,943, which is hereby incorporated by reference. In the present design, both the base 410 and rotatable drum 415 are metal. The base 410 has generally triangular fins 475 similar to those discussed previously with FIGS. 8–10. For illustrative purposes, base 410 is shown without weld material securing the base 410 to the rotatable drum 415 while base 410' is shown with weld material 419 securing the base 410' to the rotatable drum 415. One or more bases 410 may be secured to the rotatable drum 415 in this manner. One hundred or more bases may be welded upon larger rotatable drums 415.

Throughout this application reference will be made to a base welded to a rotatable drum for mining or construction operations. The invention should not be limited to this embodiment. While frequently the base is welded directly to the rotatable drum and a bit block is secured within the base, the bit block itself may be welded directly to the rotatable drum and in this arrangement the bit block actually performs as a base. For that reason, the term "base" is intended to cover both the base when it is welded directly to the drum or the bit block when it is welded directly to the drum.

Furthermore, the base or bit block may be welded to another rotatable member other than a drum such as a rotatable wheel or chain. However, for purposes of this discussion, reference will be made to a base welded to a rotatable drum with the understanding that such terminology is not intended to be limiting.

FIG. 12 illustrates a bottom view of the base 410 in FIG. 11. Specifically, the base 410 has a body 412 with a top (not shown) and a bottom 422. The bottom 422 has a bottom face 425 which contacts the surface 417 of the rotatable drum 415. The bottom 422 of the body 412 generally follows the contour of the surface 417 of the rotatable drum 415, which is cylindrical.

Locating bores 480, 485 may be used with mating pins (not shown) to position the base 410 upon the rotatable drum 415.

Many of the features in FIG. 12 are identical to those already illustrated in FIG. 10 including first side 430, second side 435 and sides 440, 445 which define outside corners 450, 455, 460, 465. Sides 430 and 435 intersect to define an outside corner region 470 which includes an outwardly extending fin 475 with similar features as those previously discussed. As best shown in FIG. 12, the fin 475 at corner 450 forms a fin angle of approximately forty-five degrees with respect to a line extending parallel to side 430 and side 435.

Figure 13:
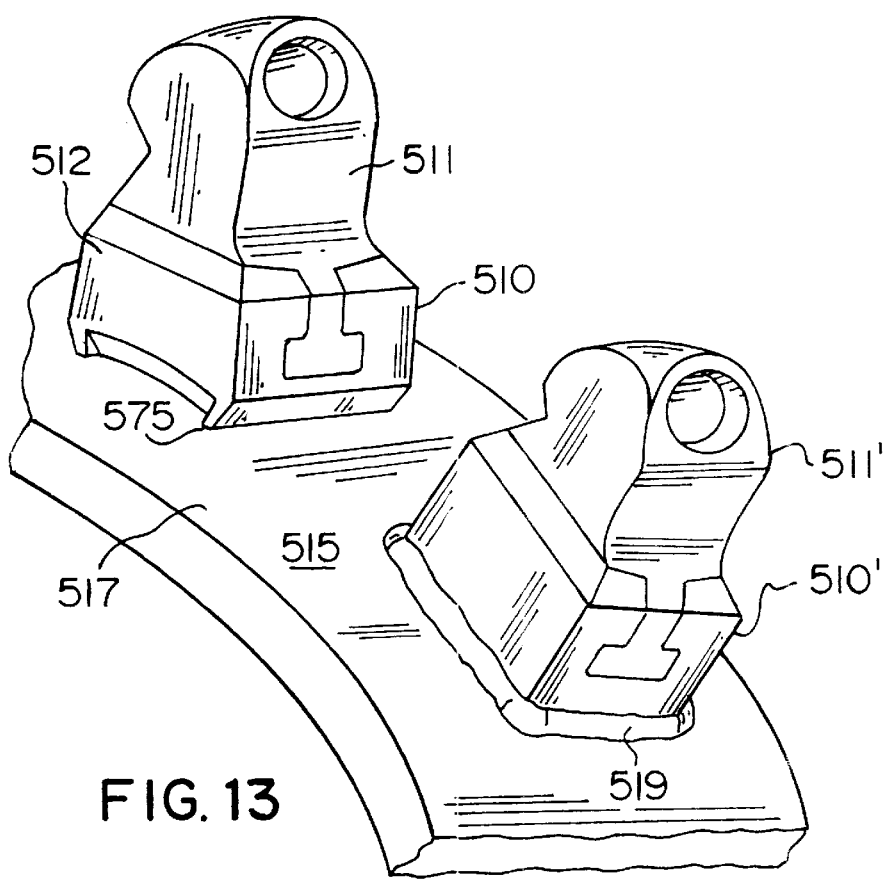
FIG. 13 illustrates a perspective view of a first member which is a base incorporating another embodiment of the subject invention and secured to the surface of a second member, which is a rotatable member, used for mining or construction operations.

FIGS. 13–16 illustrate an embodiment similar to that discussed in FIG. 7B in which at least one fin forms a fin angle B of 0° with a line extending parallel to one of the sides of the base. Specifically, FIG. 13 illustrates a base 510 with a bit block 511 for use in mining or construction operations, wherein the base 510 is secured to a surface 517 of a rotatable drum 515 used in mining or construction operations. The base 510 has fins 575 similar to those discussed previously with FIGS. 11 and 12. For illustrative purposes, the base 510 is shown without weld material securing the base 510 to the rotatable drum 515 while base 510' is shown with weld material 519 securing the base 510' to the rotatable drum 515.

Figure 14:
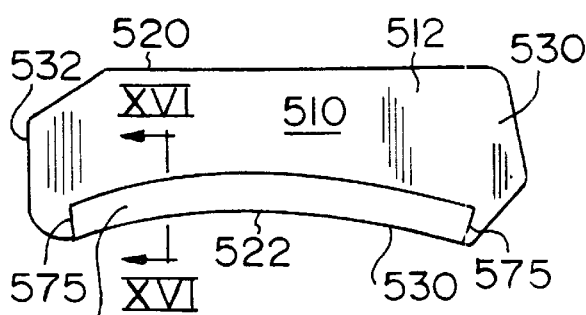
FIG. 14 is a side view of the base illustrated in FIG. 13.
Figure 15:
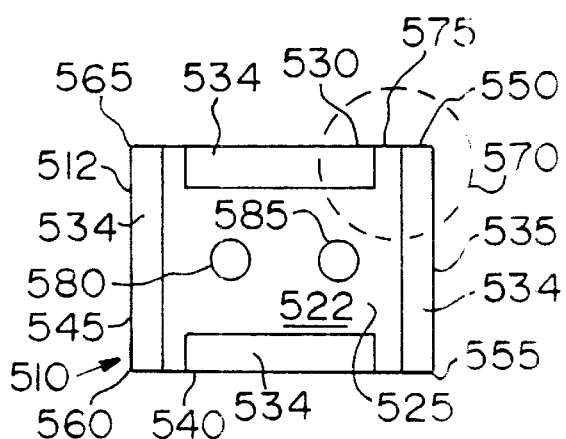
FIG. 15 is a bottom view of the base illustrated in FIG. 13.

FIG. 14 illustrates a side view of the base 510 illustrated in FIG. 13. The base 510 has a body 512 a top 520 and a bottom 522 with a bottom face 525 which contacts the surface 517 of the rotatable drum 515. As illustrated in FIG. 15 which shows a bottom view of the body 512 in FIG. 14, the body 512 has four sides 530, 535, 540, 545 and respective corners 550, 555, 560, 565. Each side may be comprised of an upper portion 532 and a lower portion 534. In a fashion similar to that discussed with respect to FIGS. 8 and 9, the lower portion 534 of each side may be chamfered such that the fin 575 extends outwardly from this chamfered surface thereby permitting the fin 575 to extend outwardly within the perimeter of the body 512.

Locating bores 580, 585 may be used with mating pins (not shown) to position the base 510 upon the rotatable drum 515.

Figure 16:
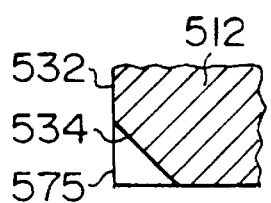
FIG. 16 is a partial section view illustrated along arrows "16—16" in FIG. 14.

FIG. 16 illustrates a section view along arrows "16—16" in FIG. 14 to highlight the upper portion 532 and the lower portion 534 of side 530 in FIG. 14. As illustrated, the fin 575 extends from the lower portion 534. The fin 575 may terminate at the periphery of the body 512 or, although not shown, may extend beyond the periphery of the body 512.

While the base 510 and the rotatable member 515 may be welded in a variety of different ways using different material, one manner of welding the base 510 to the rotatable member 515 is as follows.

The base 510 may be made of a steel such as AISI 4140, AISI 4340, AISI 8640 or AISI 8740. In the event AISI 8740 steel is used, it may be quenched and tempered to a Rockwell Hardness of between 40–45 RW "C".

The rotatable member 515 may be made of AISI 1018 or AISI 1020 steel.

The weld may be laid with GMAW (Gas Metal Arc Welding) using 7000 series flux core welding wire protected during welding by an inert gas such as carbon dioxide. The welding wire may be, for example, TR70 welding wire available from the Hobart Company or Dual Shield 7100 Ultra welding wire available from the Esap Company or equivalent welding wire from another manufacturer. A GMAW welding machine (MIG) may be used set at between 21–26 volts using $\frac{1}{16}$ inch weld wire fed at a rate suitable for amperage between 185–285 Amps.

The weld may also be laid with SMA (Shielded Metal Arc Welding) using stick electrodes available from the Hobart Company as 7018 or 7018-M stick electrodes or quivalent stick electrodes from another manufacturer with suitable welding machine.

A typical base would have a side with a length of about 3 inches and a chamfer at the bottom of the side. To lay the weld, two reverse passes are typically required. In the first pass, which is a root pass, an approximate ¼ inch width of weld material is deposited in a single direction between the base and the rotatable member at the bottom of the chamfer. In the second pass, which is the fillet pass, a fillet weld of between $\frac{5}{8}$–¾ inches is deposited in the opposite direction with a fillet oscillating pass over the root pass material. While two reverse passes are suitable for many applications, when additional weld material must be laid, additional weld passes are necessary.

Further included within the subject invention and discussed with respect to FIG. 4, is a method for attaching a first member 110 to a surface 117 of a second member 115 wherein the first member has a top 120 and a bottom 122. The bottom 122 has a bottom face 125 for contacting the mounting surface 117 of the second member 115. The first member 110 may have a plurality of sides 130, 135, 140, 145 between the top 120 and the bottom 122. However, for the purposes of the subject invention only, two adjacent sides are necessary and for that reason, reference will be made to a first side 130 adjacent to the bottom face 125 and a second side 135 adjacent to the face 125. The first side 130 and the second side 135 converge to define an outside corner region 170 between the top 120 and the bottom 122.

The method for attaching the first member 110 to the mounting surface 117 of the second member 115 is comprised of the steps of attaching a fin 175 to the first member so that the fin 175 extends from the corner region 170. The fin 175 may be attached by tack welding or by any other attachment method which would secure the fin 175 to the first member 110 during a welding operation. The first member 110 is then positioned upon the surface 117 of the second member 115 and welded along at least the first side 130 and second side 135 of the member 110 and along the surface 117 of the second member 115 adjacent to the member in the corner region 170 until the weld material covers the fin 175.

By incorporating the design of the present application into metal bases for welding onto rotatable drums used in mining or construction applications, quality welds can be readily made not only at the drum manufacturer but also out in the field. The time required to weld a base has been reduced by approximately ⅓. This produces a significant cost savings when one considers welding large numbers (e.g. 100 or more) of bases onto a drum or the cost of downtime in the field when a drum is being repaired.

It is thought that the present invention and many of its intended advantages will be understood from the foregoing description and it will be apparent that various changes may be made in the form, construction and arrangement of the parts thereof without departing from the spirit and the scope of the invention or sacrificing all of its material advantages, the form herein before described being merely preferred or exemplary embodiments thereof.

I claim:

1. A cutting tool support block comprising:
   (a) a base having a bottom,
   (b) said base having a multiplicity of sides,
   (c) said multiplicity of sides including a first side, a second side and a third side,
   (d) said first side having a T-shaped opening,
   (e) said second side adjacent said first side,
   (f) said third side is adjacent said second side,
   (g) wherein said second side and said first side intersect at an edge,
   (h) a fin means extends from said edge to promote the formation of a weld near said edge,
   (i) wherein said base has a top and said first side has a planar upper portion extending from said top to near said bottom,
   wherein said first side has a chamfered lower portion that extends from said bottom to said upper planar portion.

2. The cutting tool support block according to claim 1 wherein said fin means extend from said second side at a 90° angle.

3. The cutting tool support block according to claim 1 wherein said second side includes a chamfered lower portion.

4. The cutting tool support block according to claim 3 wherein said third side includes a chamfered lower portion, said base further comprises a fourth side adjacent said third side and said first side, wherein said fourth said includes a chamfered lower portion.

5. The cutting tool support block according to claim 1 wherein the first side and second side converge to form an angle between 10–150°.

6. The cutting tool support block according to claim 5 wherein the angle is 90°.

7. The cutting tool support block according to claim 1 wherein the fin means is integral with the base.

8. The cutting tool support block according to claim 1 wherein said bottom is flat or curved.

9. The cutting tool support block according to claim 1 wherein the fin means has a thickness and a width wherein the thickness is less than ¼ of the maximum width of the fin means.

10. The cutting tool support block according to claim 1 wherein said fin means forms an angle with one of said sides between 0–45°.

11. The cutting tool support block according to claim 10 wherein the fin means angle is 45°.

12. The cutting tool support block according to claim 1 wherein the cutting tool support block and the fin means are made of metal.

13. The cutting tool support block according to claim 1 wherein the shape of the fin means is polygonal.

14. The cutting tool support block according to claim 1 wherein the shape of the fin means is triangular.

15. A cutting tool support block comprising:
   (a) a base having a bottom,
   (b) said base having plural sides,
   (c) said plural sides including a first side and a second side,
   (d) said first side having a T-shaped opening,
   (e) said second side adjacent said first side,
   (f) wherein said second side and said first side intersect at an edge,
   (g) a fin means extends from said edge to promote the formation of a weld near said edge,
   (h) wherein said base has a top and said first side has a planar upper portion extending from said top to near said bottom,
   (i) wherein said first side has a chamfered lower portion that extends from said bottom to said upper planar portion.

16. The cutting tool support block according to claim 15 wherein the shape of the fin means is polygonal.

17. A cutting tool support block comprising:
   (a) a base having a bottom,
   (b) said base having at least a first side,
   (c) said first side has a chamfered lower portion that extends to said bottom,
   (d) a fin means adjacent said chamfer to promote the formation of a weld near an edge.

18. A cutting tool support block comprising:
   (a) a base having a bottom,
   (b) said base having at least a first side and second side,
   (c) said first side adjacent said second side,
   (d) said first side has a chamfered lower portion that extends to said bottom
   (e) said second side has a chamfered lower portion that extends to said bottom
   (f) wherein said second side and said first side intersect at an edge,
   (g) a fin means adjacent said edge to promote the formation of a weld near said edge.

19. The cutting tool support block according to claim 18 wherein said fin means is generally triangular.

20. The cutting tool support block according to claim 19 wherein said fin means forms a fin angle of approximately forty-five degress with respect to a line extending parallel to either said first side or said second side.

21. The cutting tool support block according to claim 18 wherein said fin means forms a fin angle of approximately zero degrees with respect to a line extending parallel to either said first side or said second side.

22. The cutting tool support block according to claim 18 wherein said fin means forms a fin angle of approximately forty-five degrees with respect to a line extending parallel to either said first side or said second side.

* * * * *